US011271889B2

(12) United States Patent
Volach

(10) Patent No.: US 11,271,889 B2
(45) Date of Patent: *Mar. 8, 2022

(54) SOCIAL PROFILING OF ELECTRONIC MESSAGES

(71) Applicant: Pecan Technologies Inc, Road Town (VG)

(72) Inventor: Ben Volach, London (GB)

(73) Assignee: Pecan Technologies Inc, Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,815

(22) Filed: May 29, 2020

(65) Prior Publication Data

US 2020/0296070 A1 Sep. 17, 2020

Related U.S. Application Data

(63) Continuation of application No. 14/469,653, filed on Aug. 27, 2014, now Pat. No. 10,673,802.

(60) Provisional application No. 61/871,464, filed on Aug. 29, 2013.

(51) Int. Cl.
*H04L 12/58* (2006.01)
*G06Q 50/00* (2012.01)
*G06Q 10/10* (2012.01)
*H04L 51/52* (2022.01)

(52) U.S. Cl.
CPC .......... *H04L 51/32* (2013.01); *G06Q 10/107* (2013.01); *G06Q 50/01* (2013.01)

(58) Field of Classification Search
CPC .... G06Q 50/01; G06Q 30/0269; H04L 51/32; H04L 67/306
See application file for complete search history.

(56) References Cited

U.S. PATENT DOCUMENTS

| 8,386,340 | B1 | 2/2013 | Feinstein |
| 2005/0210102 | A1 | 9/2005 | Johnson et al. |
| 2008/0133581 | A1* | 6/2008 | MacVarish ............. G06Q 10/10 |
| 2009/0144377 | A1* | 6/2009 | Kim ....................... G06Q 10/10 709/206 |

(Continued)

OTHER PUBLICATIONS

Applicant-Initiated Interview Summary dated Oct. 10, 2019 From the US Patent and Trademark Office Re. U.S. Appl. No. 14/469,653. (3 Pages).

(Continued)

*Primary Examiner* — Sang H Kim

(57) ABSTRACT

A method of associating an electronic message social profile with electronic messages. The method comprises identifying a plurality of users having a social affinity to one another, tagging each of a plurality of electronic messages received at a plurality of messaging accounts of the plurality of users with at least one user behavior tag indicative of a behavioral messaging action performed by one of the plurality of users, identifying a cluster of electronic messages having a common content from the plurality of electronic messages according to a similarity analysis, calculating, using a processor, an electronic message social profile for members of the cluster based on a combination of respective the at least one user behavior tag of the members of the cluster, and associating the electronic message social profile with the members of the cluster.

20 Claims, 3 Drawing Sheets

(56) References Cited

U.S. PATENT DOCUMENTS

| | | | |
|---|---|---|---|
| 2010/0223341 A1 | 9/2010 | Manolescu et al. | |
| 2011/0191693 A1* | 8/2011 | Baggett | G06F 16/35 715/752 |
| 2011/0270685 A1 | 11/2011 | Marks et al. | |
| 2012/0095836 A1* | 4/2012 | Kendall | G06Q 30/0255 705/14.53 |
| 2012/0151359 A1* | 6/2012 | Mysen | H04L 67/22 715/736 |
| 2013/0091223 A1* | 4/2013 | DeLuca | G06Q 50/01 709/206 |
| 2013/0311587 A1* | 11/2013 | Malik | H04L 51/32 709/206 |
| 2013/0325755 A1* | 12/2013 | Arquette | H04L 51/32 706/12 |
| 2015/0067533 A1 | 3/2015 | Volach | |
| 2015/0172337 A1 | 6/2015 | Moran et al. | |
| 2016/0028681 A1* | 1/2016 | Freire | H04L 51/22 709/204 |

OTHER PUBLICATIONS

Applicant-Initiated Interview Summary dated 13.6.17 From the US Patent and Trademark Office Re. U.S. Appl. No. 14/469,653. (2 Pages).

Applicant-Initiated Interview Summary dated Oct. 22, 2018 From the US Patent and Trademark Office Re. U.S. Appl. No. 14/469,653. (3 pages).

Communication Pursuant to Article 94(3) EPC dated Apr. 7, 2017 From the European Patent Office Re. Application No. 14182453.2. (8 Pages).

European Search Report and the European Search Opinion dated Jan. 22, 2015 From the European Patent Office Re. Application No. 14182453.2.

Official Action dated May 3, 2019 From the US Patent and Trademark Office Re. U.S. Appl. No. 14/469,653. (30 pages).

Official Action dated Mar. 14, 2018 From the US Patent and Trademark Office Re. U.S. Appl. No. 14/469,653. (30 pages).

Official Action dated Mar. 21, 2017 From the US Patent and Trademark Office Re. U.S. Appl. No. 14/469,653 (34 pages).

Official Action dated Aug. 23, 2016 From the US Patent and Trademark Office Re. U.S. Appl. No. 14/469,653.

Official Action dated Aug. 28, 2017 From the US Patent and Trademark Office Re. U.S. Appl. No. 14/469,653. (32 pages).

EPO "Notice From the European Patent Office dated Oct. 1, 2007 Concerning Bussiness Methods", Official Journal of the European Patent Office (EPO), XP007905525, 30(11): 592-593, Nov. 1, 2007.

Notice of Allowance dated Jan. 30, 2020 From the US Patent and Trademark Office Re. U.S. Appl. No. 14/469,653. (6 pages).

* cited by examiner ion Ser. No. 14/469,653 filed on Aug. 27, 2014, which claims the benefit of priority under 35 USC 119(e) of U.S. Provisional patent application Ser. No. 61/871,464 filed on Aug. 29, 2013. The contents of the above applications are all incorporated by reference as if fully set forth herein in their entirety.
SOCIAL PROFILING OF ELECTRONIC MESSAGES

RELATED APPLICATIONS

This application is a continuation of U.S. patent applicat

FIELD AND BACKGROUND OF THE INVENTION

The present invention, in some embodiments thereof, relates to messaging and, more specifically, but not exclusively, to methods and systems for profiling electronic messages.

The existing infrastructure and low cost of electronic communications has resulted in an explosion of transmitted information. Individuals are subject to an ever increasing volume of email, short message service (SMS), instant messaging and/or the like. For example, email users, especially those with broad interest or job scope, may receive hundreds of emails daily. A prominent example is newsletters dissemination which is used by many companies and organizations in order to distribute information, for example promotional content, to large-scale audiences. These include information such as News and Advertisement. These email are usually distributed to a very large distribution list (bulk email), using automated tools. Companies like Amazon™, Apple™, Best-Buy™ and the like use these emails to reach a large targeted audience.

All of these messages are sorted through in order to prioritize those communications that demand attention and eliminate those that have no value to the recipient. Additionally, messages need to be cataloged, categorized, or sorted so that they can be readily accessed at a later time. It is desirable to perform all of these tasks in an efficient manner.

Typical solutions for handling email include viewing inbound mail by priority; for example, by color coding inbox views based on the email sender. Email is often analyzed based on content and manually or automatically assigned tags, or attributes to better allow future reference. A user may often manually examine and pigeonhole email, assigning tags, or filing the email in named folders. Storing email can also be done by algorithm based on time, source, topic. Machine learning algorithms can study an email user's patterns and recommend information storage schemes, or inbound attention priority schemes. These suffer from various problems, for example, not all mail from a source may have the same connotations of urgency, topic, or importance. Manual methods for handling email are slow and effortful. While faster, and requiring less effort on the part of the user, automated analysis may fail when email correspondents are uninformed or overdramatic (e.g., when the email is written to dramatize a situation which is not dramatic, or encourage action which is unnecessary). Additionally, machine learning can reinforce poor patterns of information management, learning from the email user's errors as well as her successes. Furthermore, as users collaborate with their colleagues, it is often discovered that initial sorting, or attribute tagging may be wrong, for example, as the user comes to better understand an evolving situation.

SUMMARY OF THE INVENTION

The present invention, in some embodiments thereof, relates to messaging and, more specifically, but not exclusively, to methods and systems for profiling electronic messages.

According to some embodiments of the present invention, there is provided computerized method of associating an electronic message social profile with electronic messages. The method comprises identifying a plurality of users having a social affinity to one another, tagging each of a plurality of electronic messages received at a plurality of messaging accounts of the plurality of users with at least one user behavior tag indicative of a behavioral messaging action performed by one of the plurality of users, identifying a cluster of electronic messages having a common content from the plurality of electronic messages according to a similarity analysis, calculating, using a processor, an electronic message social profile for members of the cluster based on a combination of respective the at least one user behavior tag of the members of the cluster, and associating the electronic message social profile with the members of the cluster.

Optionally, the plurality of electronic messages comprise a member selected from a group consisting of a cellular message, an electronic mail, a broadcasted instant message (IM), and a multicasted IM.

Optionally, the common content is a common metadata value from a metadata field.

More optionally, the computerized method further comprises indicating to a first user of the plurality of users when a second user of the plurality of users is presented with a member of the cluster and establishing in response to a user input of the first user an interactive communication session between the first user and the second user.

Optionally, the social affinity is identified according to an analysis of a member selected from a group consisting of a plurality of user profiles of the plurality of users, a plurality of web browsing logs of the of the plurality of users, a plurality of past correspondences browsing logs of the of the plurality of users.

Optionally, the identifying a plurality of users is performed by an analysis of content of electronic messages designated to the plurality of users.

Optionally, the identifying a plurality of users is performed by an analysis of a plurality of correspondences between the plurality of users.

Optionally, the social affinity is indicative of at least one common demographic characteristic among plurality of users.

Optionally, the message social profile comprises a summary of a plurality of behavioral messaging actions taken by the plurality of users.

Optionally, the behavioral messaging action comprises opening an attachment in one of the plurality of electronic messages.

Optionally, the behavioral messaging action is a purchase of a product promoted in the content of the plurality of electronic messages.

Optionally, the behavioral messaging action an user set rule which is automatically applied on at least one of the plurality of electronic messages.

Optionally, the behavioral messaging action comprises responding to one of the plurality of electronic messages.

Optionally, the behavioral messaging action comprises deleting an unrendered of electronic message of the plurality of electronic messages.

Optionally, the behavioral messaging action comprises adding a user tag to one of the plurality of electronic messages.

More optionally, the computerized method further comprises monitoring a location of at least some of the plurality of users; wherein the behavioral messaging action is identified by the monitoring; wherein the behavioral messaging action is an arrival to an event location of event defined in the plurality of electronic messages.

Optionally, the social affinity is identified according to an analysis of a plurality of social connections associating between the plurality of users in a social network.

Optionally, the plurality of electronic messages comprises a plurality of newsletters.

More optionally, the computerized method further comprises filtering a forwarding of one of the plurality of electronic messages by one of the plurality of users to another based on the electronic message social profile.

Optionally, members of the cluster share at least one common electronic message identifier.

More optionally, the identifying a cluster comprises identifying the at least one common electronic message identifier by textually analyzing a plurality of word strings in each one of the plurality of electronic messages using approximate string matching algorithm.

Optionally, the identifying a cluster comprises identifying the at least one common electronic message identifier by analyzing metadata of each one of the plurality of electronic messages.

Optionally, the at least one common electronic message identifier is extracted from metadata of each member of the cluster.

According to some embodiments of the present invention, there is provided a messaging system profiling electronic messages. The system comprises a processor, and a user interface module which instructs a presentation of a user interface by a display of a client terminal, the user interface allows a certain user to tag with at least one user added tag an electronic message received at an messaging account associated with the certain user, a social analyzer module which identifies, using the processor, a users group comprising a plurality of users having a social affinity to the certain user, a profiling module which matches between the electronic message and an additional electronic message received at another messaging account associated with another user; and a additional user interface module which instructs the presentation of the at least one user added tag in association with the presentation of the additional electronic message to the another user using an additional client terminal.

According to some embodiments of the present invention, there is provided computerized method of associating an electronic message social profile with electronic messages. The method comprises identifying a users group comprising a plurality of users having a social affinity to one another, identifying a plurality of electronic messages sharing at least one common electronic message identifier, each one of the plurality of electronic messages is sent to another of the plurality of users, calculating, using a processor, an electronic message social profile for each one of the plurality of electronic messages, and associating the electronic message social profile with respective electronic message of the plurality of electronic messages.

According to some embodiments of the present invention, there is provided computerized method of tagging an electronic message for social profiling. The method comprises simultaneously presenting to a user, on a display of a client terminal and in association with one another, a user interface and a content of an electronic message, inputting by a user who uses the user interface a content quality indicative tag, identifying a plurality of users having a social affinity to the user and received a plurality of electronic messages with the content, calculating, using a processor, an electronic message social profile for the plurality of electronic messages based on the content quality indicative tag, and presenting an indication of the content quality indicative tag to the plurality of users.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
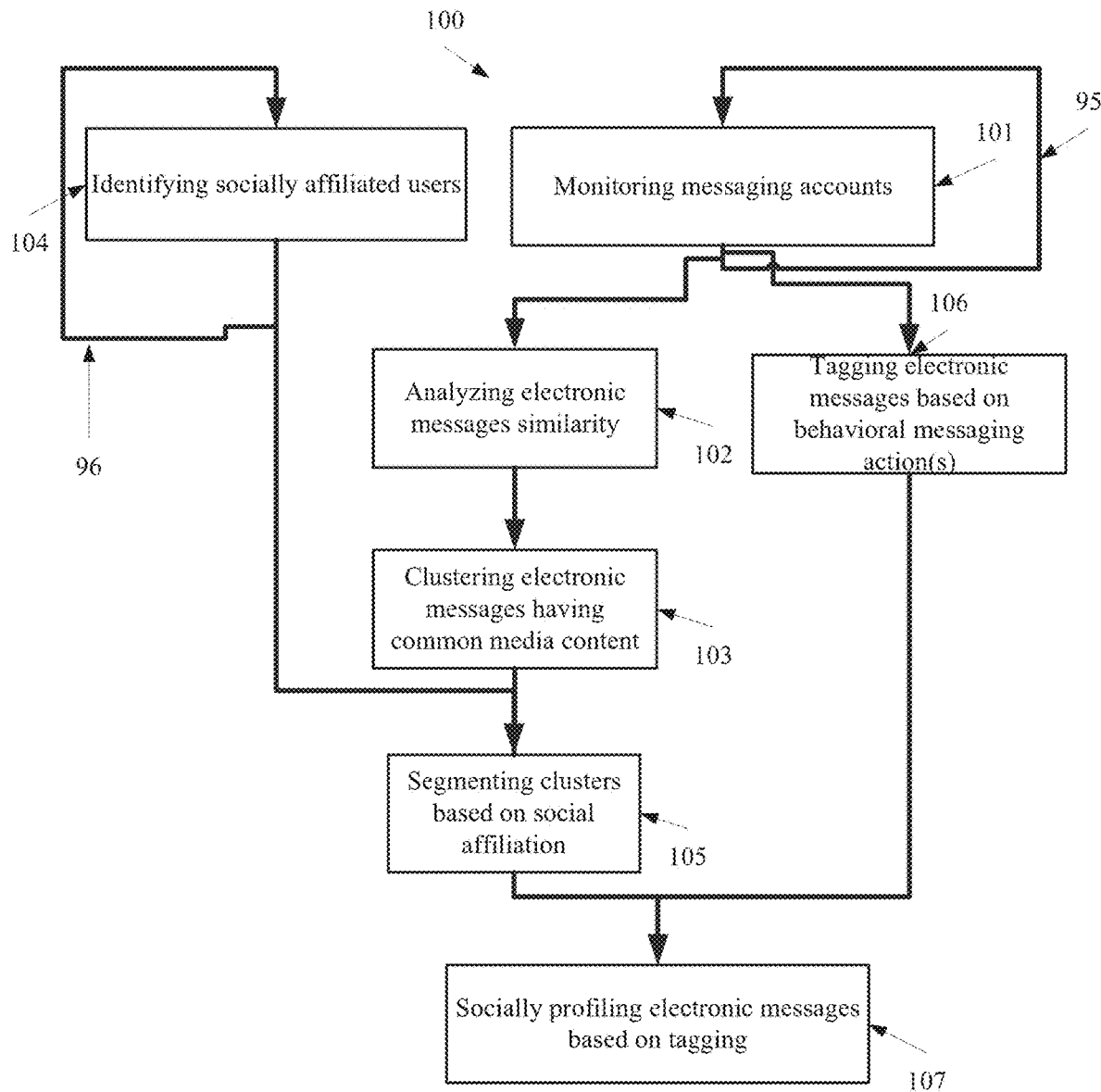
FIG. 1 is a flowchart of a method of socially profiling and tagging electronic messages based on behavioral messaging action(s) performed by one or socially affiliated users, according to some embodiments of the present invention.

The present invention, in some embodiments thereof, relates to messaging and, more specifically, but not exclusively, to methods and systems for profiling electronic messages.

According to some embodiments of the present invention, there are provided methods and systems of profiling electronic messages having common media content based on behavioral messaging action(s) of users receiving the electronic messages with the common media content, according to some embodiments of the present invention.

Optionally, a plurality of electronic messages accounts are monitored in real time to identify and cluster electronic messages having the common media content, for instance similar or identical text, links, video and/or audio content. The clustering may be performed by media content identifiers, metadata identifiers, and/or the like. By analyzing and identifying social affiliation among recipients of the electronic messages, a group of socially affiliated users who received the same media content is identified. The methods and systems allow presenting to a recipient of one of these electronic messages, a social profile indicative of behavioral messaging action(s) performed by other users regarding and/or in response to the media content. Additionally or alternatively, the methods and systems allow managing actions related to the electronic messages according to behavioral messaging action(s) performed by other users. The actions may be, for example, filtering electronic messages, forwarding electronic messages, replying to electronic messages, sorting electronic messages, ignoring electronic messages, deleting electronic messages, and/or the like.

Optionally, an infrastructure that allows recipients of the above electronic messages to communicate, for example via a chat, feedback publication or call, is provided.

According to some embodiments of the present invention, there are provided methods and systems of providing users with a tool, a user interface, for tagging media content in an electronic message they received, having their socially affiliated users, for example friends in a social network, gain value from the time they invested reviewing the media content. The tagging may indicate to socially connected users that the media content should be positively or negatively considered. The tagging may include a personal impression of the tagging user.

According to some embodiments of the present invention, there are provided methods and systems managing electronic messages traffic among or from socially affiliated users based on behavioral messaging action(s) they perform. The traffic may be managed before sorting electronic messages into folders, for example before an electronic message is added to an inbox. The traffic may be managed after the electronic messages are received, for example by implanting forwarding and/or replying rules.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart 100 of a method of socially profiling and optionally tagging electronic messages designated to users based on behavioral messaging action(s) performed by one or more other users which are socially affiliated therewith, according to some embodiments of the present invention. As used herein, an electronic message may be an electronic mail (email), an instant message, a cellular message, such as an short message service (SMS) or an multimedia messaging service (MMS), an instant message (IM), a broadcasted or multicasted media message, such as a broadcasted or multicasted text message, a broadcasted or multicasted video message and/or a broadcasted or multicasted audio message. As used herein, a behavioral messaging action is any user performed action such as opening electronic message, forwarding an electronic message, responding to an electronic message, viewing attachment(s) of an electronic message, categorizing an electronic message, blocking a recipient of an electronic message, deleting an electronic message, marking an electronic message, flagging or labeling an electronic message, moving an electronic message to a certain folder, for instance archiving, writing a response to an electronic message, ignoring an electronic message, for instance by bit opening them for elaborated presentation, the time spent on an electronic message, the number of times an electronic message was opened, which device was used to open the electronic message, browsing to link in an electronic message, searching for an electronic message, following an electronic message and/or the like.

Figure 2:
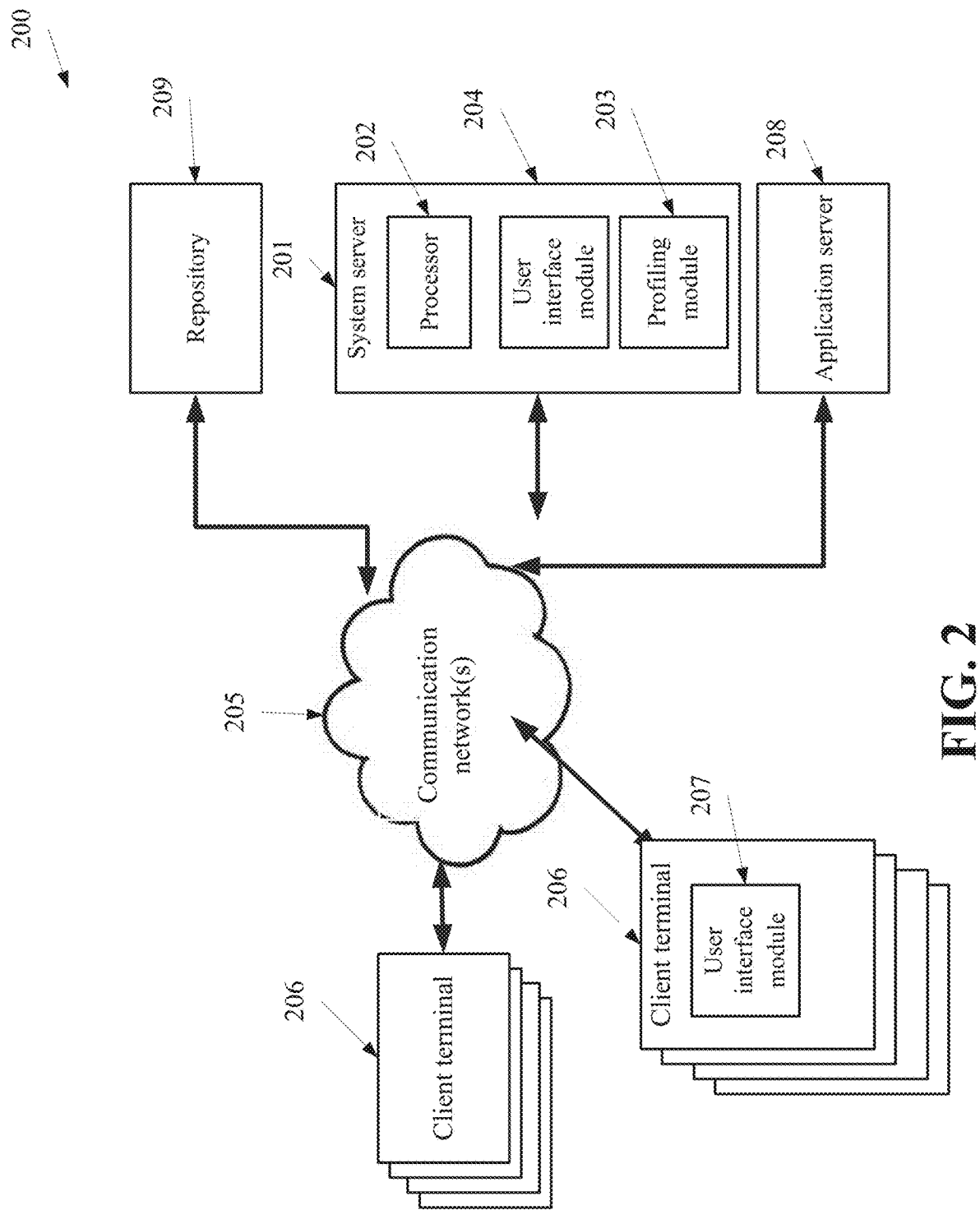
FIG. 2 is a schematic illustration a system for socially profiling and optionally tagging electronic messages, for instance by implementing the method depicted in FIG. 1, according to some embodiments of the present invention.

Reference is also made to FIG. 2, which is a schematic illustration a system 200 for socially profiling and optionally tagging electronic messages, for instance by implementing the method depicted in FIG. 1, according to some embodiments of the present invention. The system 200 includes a processor based network node, such as one or more servers 201. The one or more servers 201 includes one or more computerized processor(s) 202, such as central processor unit(s), and a profiling module 203 that socially profiles and optionally tags electronic messages, for instance as described below. The system 200 further includes one or more user interface modules. The user interface modules may be locally managed by the one or more servers 201, for instance as depicted by numeral 204. Such user interface modules 204 may be modules generating user interfaces, such as graphical user interfaces (GUIs) which are rendered by browsers installed in one or more client terminals 206, such as laptops, desktops, Smartphones, tablets, smart glasses, and/or any other user controlled computing unit. As depicted by numeral 207, the user interface modules may be installed in the client terminals 206 themselves, for instance as applications, browser add-ons, an e-mail information management software product add on and/or the like. The system 200 optionally includes one or more repositories for storing electronic messages clustering information and/or electronic messages tagging data, for instance as described below. Optionally, the profiling module 203 includes or uses application program interface (API) module(s) for interfacing with third party systems taking advantage of the electronic message profiling.

As depicted in 101, different messaging accounts of a plurality of different electronic message recipients, also referred to herein as users or recipients, are monitored. The messaging accounts may be any electronic messages account, such as mail accounts and IM accounts. The electronic message recipients are optionally subscribers of the system 200 and/or subscribers of messaging supported system or network, for instance social network peers, such as Facebook™ peers or Twitter™ peers and/or messaging service users, such as WhatsApp™ subscribers and/or Line™ subscribers.

For example, multiple email accounts are monitored by executing online processing agent(s). The processing agents scan and analyze the received emails in each monitored account. In such embodiments, an indication about new emails may be received by an email server, such as internet message access protocol (IMAP) IDLE protocol server (see RFC 2177 which is incorporated herein by reference). The new emails may be fetched and scanned by the profiling module 203. Optionally, the emails are received from the email server via a push mechanism, and then be scanned by the profiling module 203. Optionally, the emails are received from the email server by periodic fetch, for example every minute, 5 minutes, 10 minutes, 1 hour and/or any intermediate or longer period.

Figure 3:
FIG. 3 is an exemplary screenshot of content of an electronic message, according to some embodiments of the present invention.

This allows, as shown at 102, analyzing the similarly between electronic messages sent to the different messaging accounts. In such a manner, electronic messages without any substantial content differences are clustered, for example electronic messages with an addressee/recipient difference, a sender difference, a name difference, a title difference, a transmission, time difference, a personal promotional content difference, a language difference, and/or an address difference, and/or a legality section difference. As used herein, content may include textual, visual and/or audible content that is sent in an electronic message. For example, FIG. 3 depicts content, promotional content of a newsletter from Amazon™. Personal attributes of the electronic message are omitted, for instance email address and links; however, promotional offers remain as part of the content. In this example, the content has the common features in different electronic messages which are sent to different recipients, for example links, textual content, structure, and images.

The electronic messages may be originated from any source, for example an organization, such as the working place of the recipient, business entities, commercial entities such as insurance company, a car dealer, a utility company, a tourists attraction, a financial advisor, bank, a restaurant, bookmakers or handymen services, leisure or hobbies center the recipient is or is not a member of, physical social groups the recipient belongs to (for instance a book club, a museum, a gym) and special interests group (for instance a religious community, or parents to kids with special needs). The electronic message may be a newsletter. The newsletter may be sent to a user as an outcome of being registered to in a distribution list and/or any entity regardless of the user being registered.

The similarity analysis of each electronic message is based on characteristics of media content it contains and/or the metadata thereof. The analysis is optionally a similarity analysis that is set to identify similar or identical media content or metadata of different electronic messages. As used herein, media content includes text, links, video and/or audio content that is sent for presentation (visual, audible) by one or more human recipients. In the similarity analysis one or more common electronic message identifiers are identified. The electronic message identifiers, may be textual features (e.g. similar or identical text), media content features (e.g. similar or identical audio and/or video files), metadata features (e.g. similar or identical metadata fields, such as identifiers, for instance (e.g. Message-ID according to request for comments (RFC)5322 standard), structural features (e.g. an arrangement of visual components, such as text boxes and images in the electronic message), electronic message sender data, and/or electronic message size features. The similarity analysis, may include, for example, one or more of the following:

- Text matching—for example matching of words, sentences and/or paragraphs among the electronic messages. The text matching is optionally based on textually analyzing a plurality of word strings in each one of the electronic messages using approximate string matching algorithm. For example, binary comparison of the electronic messages may be established by calculating a similarity to change ratio and using a ratio threshold. Optionally, only selected part(s) of an electronic message is analyzed. The part(s) may be selected based on learning modules.
- Temporal analysis—for example matching of time of receipt, the time of delivery and/or any other time tag, for instance from the metadata of the electronic messages.
- Structural analysis—for example matching arrangements of hypertext markup language (HTML) components, and/or the like.
- Origin analysis—for example matching the direct sender and/or original sender of electronic messages, for example who is the sender which has originally sent a forwarded electronic message.
- Size analysis—for example matching the file size of the electronic messages.
- Metadata analysis—for example matching metadata fields among the electronic messages, for instance matching electronic message identifiers. For example, metadata fields, also referred to as identifiers, from an email may be fields of an email header and/or an email schema, and/or the other meta information such as the size, or MD5 hash. Such analysis does not require a full content inspection.

When the electronic messages include emails, the profiling module may compare monitored emails to identify emails which are essentially replications of one another. Optionally, the analysis may be optimized to similar messages and then a brute force may fine tune the analysis.

Optionally, promotional or advertisement content is identified and filtered out such that only the rest of the media content an electronic message contains is analyzed and optionally matched.

Optionally, a dynamic feedback user interface may be generated to allow a user to optimize parameters and settings to adjust similarity detection and avoid false negative detection, when similar emails are not detected, and/or false positive detection, when non similar emails are not detected.

As shown at 103, based on the analysis, similar or identical electronic messages received at the monitored messaging accounts are identified and optionally clustered, for example electronic messages subsets, also referred to herein as electronic message clusters, for brevity referred to herein as clusters. The clusters are optionally stored in a repository, such as 209. Each cluster represents unique media content commonly found in the electronic messages of the cluster, for example promotional content, community content, malicious content and/or the like. The content may be newsletter media content, advertisement, social network message and/or the like.

As shown at 104, groups of socially affiliated recipients are identified. Each socially affiliated recipients group includes references of users, namely monitored recipients of electronic messages, having a social affinity to one another.

The socially affiliated recipients group may be identified by analyzing social connections between the users, for instance friendship relationship in a social network such as Facebook™ or work relationship in a business network such as Linkedin™.

An exemplary socially affiliated recipients group is a group of users connected to one another by a first degree, a second degree, and/or a third degree friendship relationship and/or connected by more than one friendship relationship connection, for instance more than 2, 3, 6, 12 or any intermediate or higher number of friendship relationship connections. Additionally or alternatively, the social affinity is identified by an analysis of phonebooks or contact lists of the users. Additionally or alternatively, the social affinity is identified by an analysis of addressees of electronic emails sent by or received from the users, for instance identifying users who exchanged emails in the past. Additionally or alternatively, the social affinity is determined by an analysis of the participation of users in common or related event (e.g. festival, conference, and concert). Additionally or alternatively, the social affinity is determined by an analysis of the membership of users in common organizations. Additionally or alternatively, the social affinity is determined by a combination of any of the above examples, for instance in a weighted manner.

Additionally or alternatively, the social affinity is determined by an analysis of user profiles of the plurality of users, for example demographic characteristics of the users, such as age, gender, a newly married, a new parenting, a graduation status, an employment status (looking for first job, retiring soon), economic state, alumni, geographical origin, marital status, education level and/or the like and/or preferences such as a similar perceived interests, hobbies, activities (i.e. culture or art), community and/or the like. The user profiles may be used to identify people enlisted to the same gym, buyers of the same products (e.g. Apple buyers), follow the same sporting team, attend a common event (e.g. same festival, conference, and/or the like).

The user profiles may be created automatically, for instance from an analysis of electronic messages, an analysis of social webpage(s), web crawling and/or the like. The user profiles may be created manually, for example when the user is registered to a service. Additionally or alternatively, the social affinity is determined by web browsing logs of the users, for example identifying similar regions of interest. Additionally or alternatively, the social affinity is determined by analysis of electronic messages from the accounts of the users, for example identifying similar regions of interest. Additionally or alternatively, the social affinity is determined based on physical proximity, for example people within 1 mile radius.

Socially affiliated recipients groups may be identified separately from the identification of clusters, before the identification of clusters, for instance where clusters are identified only among electronic messages from accounts of members of a certain socially affiliated recipients group, and/or after the identification of clusters, socially affiliated recipients groups are identified per cluster.

As shown at 105, each cluster is divided to a plurality of cluster segments according to social affiliation of the recipients of the electronic messages. Each cluster segment includes electronic messages from accounts of recipients of a common socially affiliated recipients group. For example each cluster segment includes electronic messages having a common unique media content, such as a newsletter media content, which is received by a plurality of socially connected Facebook friends.

As shown at 106, each of some or all of the electronic messages at the different messaging accounts is tagged based on behavioral messaging action(s) which are performed by its recipient. Optionally, each behavioral messaging action is logged and time tagged. The tagging with a user behavior tag is indicative of a behavioral messaging action, for example as defined above, may be performed manually by one of the users (recipients), for example the owner of the respective account, for example using user interface modules 204, 207. For instance, a user may tag an electronic message with a Like tag, a spam tag, an ignore tag, a score, and/or the like. The tagging with a user behavior tag may be performed automatically, for example by the user interface modules 204, 207. For example, the user interface module 204 measures the time the user spent reviewing an electronic message and automatically tags the electronic message positively or negatively accordingly. In another example, the user interface module 204, 207 identifies a deletion without reading of an electronic message and automatically tags the electronic message negatively accordingly. In another example, the user interface module 204 identifies an electronic message which has not been fully downloaded, for example downloaded without images, and automatically tags the electronic message negatively accordingly.

In another example, the user interface module 204 identifies a forwarding without reading of an electronic message and automatically tags the electronic message positively accordingly.

According to some embodiments of the present invention, the behavioral messaging action(s) are user actions motivated by the electronic message and performed independently from the presentation of the electronic message of its media content. For example, the behavioral messaging action(s) may be a purchase of a product promoted in an electronic message, such as using a promotion code or a coupon. For example, the behavioral messaging action(s) may be an arrival of a user to an event or a retailer shop described in the electronic message optionally at the time described in the electronic message, an access to a website or webpage mentioned in described in the electronic message, an order performed in a website or webpage mentioned in described in the electronic message, and/or the like. For example, the location of a user is monitored to identify a match or a mismatch with locations described in the media content of electronic message to identify a behavioral response to the media content.

According to some embodiments of the present invention, the behavioral messaging action(s) are user set rules, for example automatic forwarding, automatic folder selection, automatic deletion and/or the like. In such embodiments, automatic deletion may be indicative of a negative behavioral messaging action and an automatic forwarding to other recipients and/or a folder marked as urgent or VIP may be indicative of a positive behavioral messaging action. Additionally or alternatively, behavioral messaging action(s) on a certain electronic message may be weighted in light of user set rules which are applied on the certain electronic message.

As shown at 107, each cluster segment is profiled based on the tags of the electronic messages it contains. As used herein, containment of a cluster includes any association between a cluster and a grouping identifier, for instance a list or a reference such as a link. For example, the profiling module 203 calculates an electronic message social profile for some or all of the electronic messages of a certain cluster segment based on a combination of user behavior tags of members of electronic messages from the certain cluster segment.

Optionally, the calculated electronic message social profile is associated with any message in the certain cluster segment and/or any electronic message added to the certain cluster segment. For example, when a member of a certain socially affiliated recipients group receives an electronic message identified as related to a cluster segment divided from a respective cluster for the certain socially affiliated recipients group, the electronic message is profiled as other electronic messages in the socially affiliated recipients group.

For example, the social profile may be presented in association with the electronic message. For instance, the presented notification includes the notification "5 of your friends opened an attachment and viewed a video in this email" and/or "3 of your friends forwarded this email". Any other action related to the media content of the electronic message may also be specified, for example list of indirect actions resulted from the electronic message (e.g. the number and/or identity of users who used a coupon received in the electronic message, the number and/or identity of users who made a purchase of a product and/or participated in an event advertised in the electronic message, the number and/or identity of users who downloaded an application advertised in the electronic message.

Optionally, the social profile includes a score, a rank, and/or a status calculated based on the recorded tags. For example, the social profile includes a color on a scale reflecting user's perception about the media content, for example red reflects malicious or boring and green reflects safe or interesting.

Optionally, the social profile includes a summary of a plurality of behavioral messaging actions taken by respective users, for example the number of Like tags, for example the number of dislike tags, an average viewing time, a time to deletion, ratio between the number of users who deleted without reading and the number of users who deleted after reading, and/or the like.

According to some embodiments of the present invention, the social profile of an electronic message, namely the social profile of the cluster segment to which it belongs, is presented to a viewer of the electronic message, for instance by a browser or a messaging and/or personal information management software. Optionally, the social profile is rendered by a browser add on. Optionally, the social profile is rendered by a browser toolbar. Optionally, the social profile is rendered as an overlay on top of a presentation of the electronic message. Optionally, the social profile is rendered as an overlay on top of a presentation of the electronic message.

As shown at 95, 96, the electronic message accounts and the social affiliation among the users is continuously monitored, allows updating the cluster segments and their social profiling continually, for example iteratively.

According to some embodiments of the present inventions, the system 200 allows a recipient watching an electronic message from a certain cluster or cluster segment to establish a communication session with one or more other recipients of an electronic message from the same cluster or cluster segment, for example users of a socially affiliated recipients group to which she belongs. The communication session may be a chat, an IM session, Optionally, session is established by a GUI that is presented in association with the electronic message, for example a GUI indicating which of the other users is currently reviewing an electronic message from the same cluster or cluster segment, namely with the same or similar media content. Optionally, the GUI present indications of which of the users is currently reviewing these electronic messages, for instance using online, offline, and busy signs. In such a manner, users watching the same media content, for example a newsletter may communicate to exchange opinion thereabout. Optionally, a transcript of the communication session is created and logged. Such a transcript is a behavioral messaging action which may be monitored and analyzed to automatically generate respective user behavior tags. For example, the transcript may be semantically and/or contextually analyzed to identify positive or negative reaction to the media content.

According to some embodiments of the present inventions, the system 200 allows a recipient watching an electronic message from a certain cluster or cluster segment to leave remarks, comments, to one or more other recipients of an electronic message from the same cluster or cluster segment, for example users of a socially affiliated recipients group to which she belongs. This allows the user to leave a personal note pertaining to the media content. The remarks and/or comments are behavioral messaging action(s) which may be monitored and analyzed to automatically generate respective user behavior tags. For example, the remarks and/or comments may be semantically and/or contextually analyzed to identify positive or negative reaction to the media content.

According to some embodiments of the present inventions, the system 200 manages the transmission of electronic messages based on their social profile, for instance controls or adjusts the forwarding and/or reply pattern of electronic messages based on their social profiles. For example, a forwarding of an electronic message may be moderated by presenting to the sending user a notification emphasizing the social profile of the electronic message, for example presenting a notification asking a user to confirm a forwarding of the electronic message to a friend even though the electronic message was tagged with a social profile:"spam", "dislike", and/or "waste of time". In another example, when deleting an unopened message that others have spent time reading, in yet another example, a calendar invitation that many others accepted is declined.

According to some embodiments of the present inventions, the system 200 performs socially related actions including automatic forwarding of the media content in electronic messages of a certain cluster segment to members of a respective socially affiliated recipients group based on the analysis of the recipients in the certain bucket. For instance, if the media content is an event related media content including an invitation to an event, the analysis of the recipients in the certain bucket may be used to automatically identify socially connected users who did not receive the event related media content. In another example, the socially related actions depend on the reaction of the recipients of electronic messages in a certain cluster segment to the media content of the electronic messages. For instance, when a positive reaction to promotional media content is identified based on the analysis of socially related actions the promotional media content is forwarded to other members of a respective socially affiliated recipients group.

According to some embodiments of the present inventions, social profiles of electronic messages are used for dynamic filtering thereof. In such embodiments, an electronic message that is about to be added to an incoming account is matched with a cluster segment, for instance as described above, and profiled accordingly with a social profile. Based on the social profile the received electronic message is stored in an inbox, stored in a junk mail inbox, automatically deleted, automatically tagged and/or the like. Optionally, a tag indicative of the social profile is added to the title of an electronic massage. Additionally or alternatively, a tag indicative of the social profile is added to the metadata of an electronic massage. Additionally or alternatively, a tag indicative of the social profile is added to the text of the media content of an electronic massage. This allows filtering of an electronic message using existing filtering methods and systems.

According to some embodiments of the present inventions, social profiles of one recipient of electronic messages clustered in a cluster segment are updated or calculated based on the social profiles of recipients of electronic messages clustered in the cluster segment. For example, differences between social profiles of these recipients are identified and used to create a social profile for each recipient or for a new recipient. In such embodiments, when an electronic message, such as a newsletter is received, a social profile to one or more of its recipients is created based on the characteristics of recipients which are socially affiliated thereto.

Reference is now made to exemplary profiling of an electronic message, a newsletter, according to some embodiments of the present invention. For example, electronic messages, emails, including a newsletter received by various recipients from Amazon(dot)com differ in time, recipient address and unsubscribe links; however, this electronic messages share the exact promotional media content including headers fields such as the "from address". The system 200, for example using the profiling module 203, monitors email accounts of users and maps them, holding a pointer to all instances of the same newsletter. Once such mapping is established functionalities are offered as described above.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a unit, a module, a network, and a server is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computerized method of associating an electronic message social profile with electronic messages, comprising:

identifying a plurality of users having a social affinity to one another;

identifying a behavioral messaging action performed on each of a plurality of electronic messages received at a plurality of messaging accounts of said plurality of users, said behavioral action is performed by a respective one of said plurality of users and is a member of a group consisting of:

opening an attachment in one of said plurality of electronic messages, a purchase of a product promoted in a content of said plurality of electronic messages, a user set rule which is automatically applied on at least one of said plurality of electronic messages, responding to one of said plurality of electronic messages, deleting an unrendered electronic message of said plurality of electronic messages, and adding a user tag to one of said plurality of electronic messages;

tagging each of said plurality of electronic messages with at least one user behavior tag indicative of said identified behavioral messaging action performed on respective each of said plurality of electronic messages;

identifying among said plurality of electronic messages received at said plurality of messaging accounts of said plurality of users, a cluster of electronic messages having a common content according to a similarity analysis;

calculating, using a processor, an electronic message social profile which is common for members of said cluster of electronic messages, based on a combination of respective said at least one user behavior tag of said members of said cluster of electronic messages; and associating with each of said members of said cluster of electronic messages, said electronic message social profile, common for said members of said cluster.

2. The computerized method of claim 1, wherein said plurality of electronic messages comprise a member selected from a group consisting of a cellular message, an electronic mail, a broadcasted instant message (IM), and a multicasted IM.

3. The computerized method of claim 1, wherein said common content is a common metadata value from a metadata field.

4. The computerized method of claim 1, further comprising indicating to a first user of said plurality of users when a second user of said plurality of users is presented with a member of said cluster and establishing in response to a user input of said first user an interactive communication session between said first user and said second user.

5. The computerized method of claim 1, wherein said social affinity is identified according to an analysis of a member selected from a group consisting of a plurality of user profiles of said plurality of users, a plurality of web browsing logs of said of said plurality of users, a plurality of past correspondences browsing logs of said of said plurality of users.

6. The computerized method of claim 1, wherein said identifying a plurality of users is performed by an analysis of content of electronic messages designated to said plurality of users.

7. The computerized method of claim 1, wherein said identifying a plurality of users is performed by an analysis of a plurality of correspondences between said plurality of users.

8. The computerized method of claim 1, wherein said social affinity is indicative of at least one common demographic characteristic among plurality of users.

9. The computerized method of claim 1, wherein said message social profile comprises a summary of a plurality of behavioral messaging actions taken by said plurality of users.

10. The computerized method of claim 1, wherein said behavioral messaging action comprises opening an attachment in one of said plurality of electronic messages.

11. The computerized method of claim 1, wherein said behavioral messaging action is a purchase of a product promoted in the content of said plurality of electronic messages.

12. The computerized method of claim 1, wherein said behavioral messaging action an user set rule which is automatically applied on at least one of said plurality of electronic messages.

13. The computerized method of claim 1, wherein said behavioral messaging action comprises responding to one of said plurality of electronic messages.

14. The computerized method of claim 1, wherein said behavioral messaging action comprises deleting an unrendered of electronic message of said plurality of electronic messages.

15. The computerized method of claim 1, wherein said behavioral messaging action comprises adding a user tag to one of said plurality of electronic messages.

16. The computerized method of claim 1, further comprising monitoring a location of at least some of said plurality of users; wherein said behavioral messaging action is identified by said monitoring; wherein said behavioral messaging action is an arrival to an event location of event defined in said plurality of electronic messages.

17. The computerized method of claim 1, wherein said social affinity is identified according to an analysis of a plurality of social connections associating between said plurality of users in a social network.

18. The computerized method of claim 1, wherein said plurality of electronic messages comprises a plurality of newsletters.

19. The computerized method of claim 1, further comprising filtering a forwarding of one of said plurality of electronic messages by one of said plurality of users to another based on said electronic message social profile.

20. The computerized method of claim 1, wherein members of said cluster share at least one common electronic message identifier.

* * * * *